March 31, 1959  J. M. F. VAN DE VEN  2,880,411
MAGNETIC COUPLING DEVICES
Filed Nov. 15, 1954

INVENTOR:
Jan Marie Frans Van de Ven
BY: Baldwin & Wight
ATTORNEYS

United States Patent Office 2,880,411
Patented Mar. 31, 1959

2,880,411

MAGNETIC COUPLING DEVICES

Jan Marie Frans van de Ven, Neuilly, France, assignor to Rotameter Manufacturing Company Limited, Croydon, England, a British company Application November 15, 1954, Serial No. 468,941

Claims priority, application France December 5, 1953

6 Claims. (Cl. 340—378)

The present invention relates to magnetic coupling devices more particularly for coupling a movable member with an indicating device so that the indicating device records the movement of the member. The invention finds special application in liqiud flow measuring apparatus and liquid level-indicating apparatus, for coupling the float of the apparatus, which float is free to rotate about its axis, to suitable indicating means for recording the movement of the float. It has heretofore been proposed to effect a magnetic coupling between a member movable along a rectilinear path, and an indicator such as a pointer moving over a graduated scale, by means of two opposed bar magnets carried by the member and placed end to end in the direction of movement of the member, and a third magnet connected to the indicator pointer which third magnet, when at rest, is perpendicular to the axis of the two opposed magnets, with one pole thereof of opposite polarity to that of the juxtaposed like poles of the two magnets carried by the movable member lying adjacent the said juxtaposed poles. However, the said prior proposal has the disadvantage that the zone which the magnetic field produced by the opposed magnets can act effectively upon the third magnet connected to the pointer is extremely limited both in the direction of movement of the member and in the radial direction. The third magnet must therefore be positioned very close to the opposed magnets carried by the movable member, which is not always convenient and in the case of liquid flow meters or level indicators requires the provision of a magnet-carrying extension to the float and a T inlet pipe for feeding the liquid into the float chamber of the meter.

The invention has for an object to provide an improved magnetic coupling between a member movable along a rectilinear path and an indicating device for indicating the movement of the member, and according to the invention, such a magnetic coupling is characterised in that the movable member carries one or more magnets adapted to produce a magnetic field extending radially with respect to the direction of movement of the member and substantially uniform in the vicinity of the movable member, and the indicating device comprises a pointer operatively connected to one or more magnets adapted to rotate about an axis perpendicular to the direction of movement of the movable member and producing a magnetic field having arc-shaped lines of force positioned in a plane parallel to the said direction of movement and preferably symmetrical with respect to the neutral or rest position of the pointer.

The invention will now be described with reference to the accompanying drawings illustrating several embodiments of the invention and in which.

Figure 1:
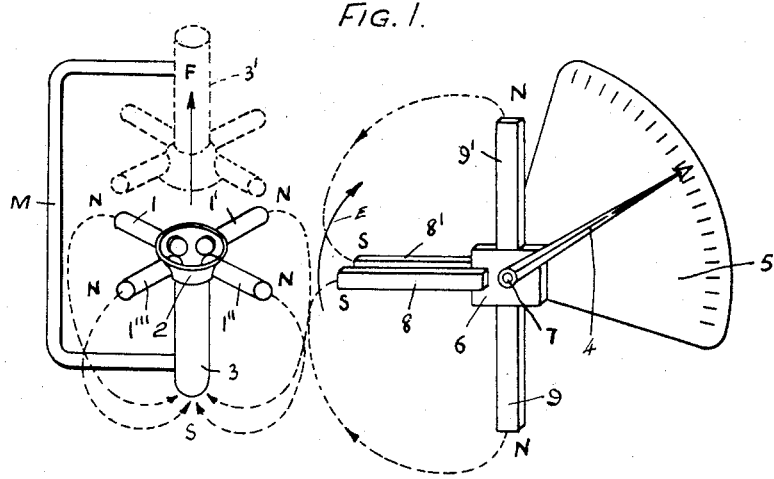
Fig. 1 is a view in perspective of a movement-indicating apparatus including a magnetic coupling according to the invention.

Referring firstly to Fig. 1, a first movable member or element M adapted for rectilinear movement in the direction of the arrow F, carries four magnets 1, 1', 1'', 1''', which may be of cylindrical shape (as shown) or of rectangular cross section, arranged radially and having their like poles for example the north pole, pointing outwardly, and the opposite poles pointing inwardly and magnetically connected together by a cup shaped ring 2 mounted on the upper end of a magnet 3 extending axially of the ring 2, the south pole of the assembly being at the lower end of the magnet 3. This arrangement produces in the horizontal plane of the magnets 1 a substantially uniform, radially extending magnetic field the lines of force of which are in the form of arcs as indicated by dotted lines. An indicating unit which carries an indicating pointer constituting a second member or element 4 movable over a stationary scale 5 comprises a support 6 which is pivotally mounted on a horizontal axis 7 and to which there are attached two small magnets 8, 8', extending outwardly therefrom in spaced parallel relation and adapted to occupy a substantially horizontal position when the apparatus is in the neutral or rest position as shown in Figure 1. Two opposed magnets 9, 9' are also secured to the support 6 extending outwardly therefrom in opposed directions at right angles to the magnets 8, 8' and co-operating therewith to produce a magnetic field the lines of force of which are substantially arc-shaped and lie in a vertical plane perpendicular to the radial field produced by the magnets 1—3 and adjacent the substantially horizontal portion of the radial field.

In the operation of the apparatus described, when the movable member M moves upwards in the direction of the arrow F, the poles N of the radial magnets 1, exert an attraction on the poles S of the magnets 8, 8' so that the support 6 is caused to rotate in the direction of the arrow E. The rotation of the support is assisted by the repulsion acting between the north poles of the magnet 9' and of the magnets 1 and also by the attraction exerted by the south pole of the magnet 3 on the north pole of the magnet 9. There is thus provided a very close magnetic linkage and a sudden movement of the assembly 1—3 in either direction will be unlikely to cause uncoupling of the apparatus since, providing the amplitude of the sudden movement does not exceed the extent of repulsion zone, the magnets 8, 9 of the indicating unit remains always within the sphere of action of the magnets 1—3 of the movable member M and will always be moved towards the point of maximum attraction.

To increase the output performance of the apparatus as well as the intensity and the concentration of the horizontal field produced by the magnets carried by the movable member M, there may be provided a further set of magnets similar to the magnets 1—3 and opposed thereto as shown diagrammatically in dotted lines at 3'.

Figure 2:
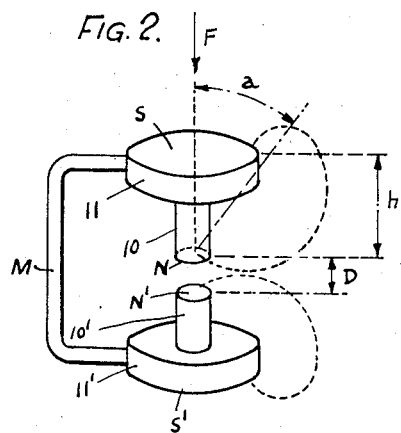
Fig. 2 is a perspective of an alternative arrangement of magnets.

The uniformity of the field and its concentration in the horizontal plane can also be increased, more particularly in the case of rotatable floats employed in flowmeters, by the use of a magnet arrangement as shown in Fig. 2 in which the movable member M or float carries two opposed axial magnets 10, 10', placed at a distance from each other, and provided at opposite ends with large disc-shaped pole pieces 11, 11'. With such an arrangement the lines of force emanating from the adjacent poles N, N' of the two magnets will display less divergence in the vicinity of these poles so that, as a result, the field intensity in the horizontal centre plane of the apparatus is increased and the radius of the zone in which this field retains a horizontal component of higher intensity is likewise greater. This concentration of the horizontal magnetic field depends on the distance D separating the two magnets 10, 10', on their length $h$, and on the angle $a$ determined by the relationship between the radius of the pole pieces 11, 11' and the length $h$ of the magnets. These three parameters will be determined in accordance with the distance separating the movable member M, carrying the magnet assembly 10, 11, 10'—11', from the indicating unit magnets 8, 9.

Figure 3:
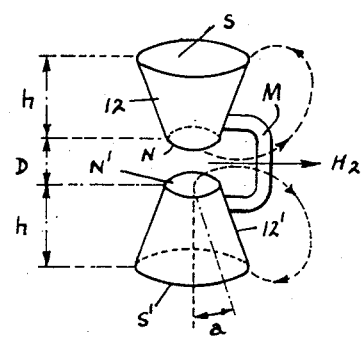
Fig. 3 is a perspective of further alternative arrangement of magnets.

An improved result can be achieved by using, as shown in Fig. 3, two magnets 12, 12' of truncated-cone shape positioned with their smaller ends faced opposite each other, and which produce a radial horizontal component H2 of the field, the intensity of which depends on the same parameters D, $h$ and $a$ as in the arrangement of Figure 2.

Figure 4:
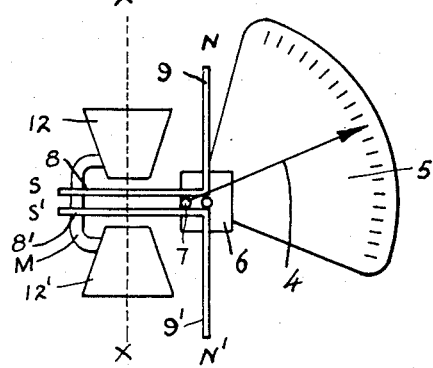
Fig. 4 is a front view of a flow meter embodying a magnetic coupling according to the invention.

It should be mentioned that with the arrangement shown in Fig. 1, in which the plane of vertical symmetry of the indicating unit passes through the axis of the movable member magnet system, the graduation of the scale 5 cannot be proportional to the movement of the movable member, since the angular deflection is a decreasing function of this movement. According to another feature of the invention approximate proportionality of the scale graduation is obtained by locating the indicating unit laterally with respect to the moving magnet system, as shown in Fig. 4, that is to say so that the vertical plane of symmetry of the magnets 8—9 and 8'—9' is parallel to the axis X—X' of the magnet system 12—12' carried by the movable member M, which axis is positioned so as to lie approximately at the centre of the magnets 8, 8'.

By the use of the present invention it is possible to produce an indicator capable of measuring a total movement of 120 mm. of a movable body for example the float of a flow-meter with a pointer sweeping over an arc of 100° by using two frustro-conical magnets weighing 80 grams including the weight of the float, and four indicating magnets 80 to 100 mm. long, of which two are of 4 mm. diameter and two of 7 mm. diameter, and weighing about 150 grams together with their support and the pointer, the distance D between the two frustro-conical magnets being of the order of 20 to 30 mm., by which the angular displacement of the pointer is substantially proportional to the movement of the float.

It will be understood that the invention is not limited to the use of permanent magnets and that electro-magnets or other electrical devices for producing the required magnetic fields may be equally employed.

I claim:

1. In a system having a first movable element and a second movable element, means for magnetically coupling said second element to the said first element whereby the said second element will be moved in response to movement of the first element, the said coupling means comprising a pair of axially aligned magnets carried by said first element and movable therewith and having adjacent similar poles spaced one from the other a substantial distance, a movably mounted follower magnet having a pole disposed adjacent the path of travel of said pair of axially aligned magnets which pole is magnetically opposite to the said spaced adjacent poles and forms therewith a magnetic coupling, a further magnet connected to said follower magnet and movable therewith and angularly disposed with respect thereto, the said further magnet extending from the follower magnet in the direction of the path of travel of said pair of magnets and having at its end remote from the follower magnet a pole which is magnetically similar to the spaced adjacent poles of the axially aligned magnets whereby the repulsion between the spaced adjacent poles and the said pole of the further magnet assists the movement of the follower magnet in response to movement of said pair of magnets, and means connecting said follower magnet and said further magnet to the second element for effecting movement of the second element in response to movement of the follower and said further magnet.

2. A system as claimed in claim 1 in which the said axially aligned magnets are formed to have a cross-section which increases in the axial direction from a minimum at the ends thereof providing the said adjacent poles to a maximum at the other ends thereof.

3. In a system having a meter for measuring variations in a variable condition, said meter being provided with a member movable in response to said variations, and having means for indicating the movement of said member, means for magnetically coupling the said member to the indicating means, said coupling means including a pair of axially aligned magnets carried by said member and movable therewith and having adjacent similar poles spaced one from the other a substantial distance, a follower magnet system and means for actuating the indicating means in response to movement of the follower magnet system, the said follower magnet system comprising two pairs of magnets the magnets of one pair extending in spaced parallel relation to provide at one end thereof spaced poles disposed adjacent the path of travel of the pair of axially aligned magnets, which poles are of like polarity and magnetically opposite to the said spaced adjacent poles of the axially aligned magnets, the magnets of the other pair extending in opposed directions from the other ends remote from the said one end of the first pair of magnets to provide poles which are magnetically similar to the adjacent poles of the axially aligned magnets, and means connecting the said follower magnet system to the indicating means for effecting actuation of the indication means in response to movement of the follower magnet system.

4. In a system having a first movable element and a second movable element, means for magnetically coupling said second element to the said first element, the said coupling means comprising a first magnet carried by said first element and movable therewith, a movably mounted second magnet having a pole disposed adjacent the path of travel of said first magnet and normally occupying a position in proximity to a pole of the first magnet which is magnetically opposite thereto, to form therewith a magnetic coupling, a third magnet connected to said second magnet and movable therewith and angularly disposed with respect thereto, the said third magnet extending from the second magnet in the direction of the path of travel of the first magnet and having at its end remote from the second magnet a pole which is magnetically similar to the said pole of the first magnet whereby the repulsion between the said pole of the first magnet and the said pole of the third magnet assists the movement of the second magnet in response to movement of the first magnet, and means connecting the second and third magnets to the second element for effecting movement of the second element in response to movement of the second and third magnets.

5. In a system having a first movable element and a second movable element, means for magnetically coupling said second element to the said first element whereby the said second element will be moved in response to movement of the first element, the said coupling means comprising a pair of axially aligned magnets carried by said first element and movable therewith and having adjacent similar poles spaced one from the other a substantial distance, the said magnets being of frusto-conical shape with their smaller ends constituting said adjacent similar poles, a movably mounted follower magnet having a pole disposed adjacent the path of travel of said pair of axially aligned magnets which pole is magnetically opposite to the said spaced adjacent poles and forms therewith a magnetic coupling, a further magnet connected to said follower magnet and movable therewith and angularly disposed with respect thereto, the said further magnet extending from the follower magnet in the direction of the path of travel of said pair of magnets and having at its end remote from the follower magnet a pole which is magnetically similar to the spaced adjacent poles of the axially aligned magnets whereby the repulsion between the spaced adjacent poles and the said pole of the further magnet assists the movement of the follower magnet in response to movement of said pair of magnets, and means connecting said follower magnet and said further magnet to the second element for effecting movement of the second element in response to movement of the follower and said further magnet.

6. In a system having a first movable element and a second movable element, means for magnetically coupling said second element to the said first element whereby the said second element will be moved in response to movement of the first element, the said coupling means comprising a pair of axially aligned magnets carried by said first element and movable therewith and having adjacent similar poles spaced one from the other a substantial distance, the said magnets each comprising a cylindrical magnet co-axial with the axis of alignment of the pair of magnets, one end of each cylindrical magnet providing one of said adjacent poles, and an enlarged pole piece at the other end of each of said cylindrical magnets, a movably mounted follower magnet having a pole disposed adjacent the path of travel of said pair of axially aligned magnets which pole is magnetically opposite to the said spaced adjacent poles and forms therewith a magnetic coupling, a further magnet connected to said follower magnet and movable therewith and angularly disposed with respect thereto, the said further magnet extending from the follower magnet in the direction of the path of travel of said pair of magnets and having at its end remote from the follower magnet a pole which is magnetically similar to the spaced adjacent poles of the axially aligned magnets whereby the repulsion between the spaced adjacent poles and the said pole of the further magnet assists the movement of the follower magnet in response to movement of said pair of magnets, and means connecting said follower magnet and said further magnet to the second element for effecting movement of the second element in response to movement of the follower and said further magnet.

References Cited in the file of this patent

UNITED STATES PATENTS 2,425,691     Brewer _____ Aug. 12, 1947